(12) United States Patent
Duan et al.

(10) Patent No.: US 12,234,361 B2
(45) Date of Patent: Feb. 25, 2025

(54) COMBINED TREATMENT DEVICE AND METHOD FOR SURFACE MODIFICATION OF FUMED SILICA

(71) Applicants: GUANGZHOU HUIFU RESEARCH INSTITUTE CO., LTD., Guangdong (CN); HUBEI HUIFU NANOMATERIAL CO., LTD., Hubei (CN)

(72) Inventors: Xianjian Duan, Guangdong (CN); Chunlei Wu, Guangdong (CN); Yuelin Wang, Guangdong (CN); Shiyu Xu, Guangdong (CN); Chenggang Wang, Hubei (CN)

(73) Assignees: GUANGZHOU HUIFU RESEARCH INSTITUTE CO., LTD., Guangdong (CN); HUBEI HUIFU NANOMATERIAL CO., LTD., Hubei (CN)

( * ) Notice: Subject to any disclaimer, the term of this patent is extended or adjusted under 35 U.S.C. 154(b) by 134 days.

(21) Appl. No.: 17/883,638

(22) Filed: Aug. 9, 2022

(65) Prior Publication Data
US 2022/0389228 A1 Dec. 8, 2022

Related U.S. Application Data

(63) Continuation of application No. PCT/CN2020/081454, filed on Mar. 26, 2020.

(30) Foreign Application Priority Data

Feb. 20, 2020 (CN) .......................... 202010105021.2
Feb. 20, 2020 (CN) .......................... 202010105041.5

(51) Int. Cl.
*C09C 1/30* (2006.01)
*B01D 45/16* (2006.01)
(Continued)

(52) U.S. Cl.
CPC ............ *C09C 1/3081* (2013.01); *B01D 45/16* (2013.01); *B01D 46/02* (2013.01); *B01D 50/20* (2022.01);
(Continued)

(58) Field of Classification Search
CPC ......... C09C 1/3081; C09C 3/12; B01D 50/20; B01D 46/02; B01D 45/16; B01D 1/22; B01J 8/18; B01J 8/24; B01J 8/26
(Continued)

(56) References Cited

U.S. PATENT DOCUMENTS 3,924,029 A * 12/1975 Schutte ................... C09C 1/309
106/490
3,953,487 A * 4/1976 Kratel ....................... C09C 3/12
556/456

(Continued)

FOREIGN PATENT DOCUMENTS

CN 101723317 6/2010
CN 103059572 4/2013
(Continued)

OTHER PUBLICATIONS

"International Search Report (Form PCT/ISA/210) of PCT/CN2020/081454", mailed on Nov. 18, 2020, with English translation thereof, pp. 1-6.

*Primary Examiner* — Brian K Talbot
(74) *Attorney, Agent, or Firm* — JCIPRNET

(57) ABSTRACT

The present disclosure relates to a combined treatment method for surface modification of fumed silica, which comprises the following steps: (1) two sets of modification devices are used to jointly treat fumed silica; the fumed silica is modified with a modifier in the reaction furnace of each set of modification devices to obtain two groups of modified fumed silica and exhaust gas respectively; (2) the
(Continued)

exhaust gas obtained in step (1) is separated respectively to obtain unreacted modifier and by-products, and the obtained by-products are input into the reaction furnace of the other set of modification devices as reaction assistants to participate in the modification reaction; and the obtained unreacted modifiers are returned to the reaction furnace of the original modification device for repeated use.

13 Claims, 7 Drawing Sheets

(51) Int. Cl.
- B01D 46/02 (2006.01)
- B01D 50/20 (2022.01)
- C09C 3/12 (2006.01)
- B01J 8/18 (2006.01)
- B01J 8/24 (2006.01)
- B01J 8/26 (2006.01)
- B05D 1/22 (2006.01)

(52) U.S. Cl.
CPC . C09C 3/12 (2013.01); B01J 8/18 (2013.01); B01J 8/24 (2013.01); B01J 8/26 (2013.01); B05D 1/22 (2013.01)

(58) Field of Classification Search
USPC .......................................................... 427/213
See application file for complete search history.

(56) References Cited

U.S. PATENT DOCUMENTS

| | | | | |
|---|---|---|---|---|
| 4,030,940 A * | 6/1977 | Chuiko | ................ | C09C 1/3081 106/490 |
| 4,503,092 A * | 3/1985 | Klebe | ................ | C09C 1/3081 423/337 |
| 4,515,762 A * | 5/1985 | Griesshammer | ................ | C01B 33/10757 423/613 |
| 4,554,147 A * | 11/1985 | Stoll | ................ | C09C 1/3081 423/337 |
| 5,183,710 A * | 2/1993 | Gerbino | ................ | E01C 3/06 427/221 |
| 5,372,795 A | 12/1994 | Muhlhofer et al. | | |
| 5,458,916 A * | 10/1995 | Kratel | ................ | C09C 3/043 427/372.2 |
| 5,902,636 A * | 5/1999 | Grabbe | ................ | C03C 25/1065 423/337 |
| 5,919,298 A * | 7/1999 | Griffith | ................ | C08K 9/06 106/490 |
| 6,696,034 B2 * | 2/2004 | Nozawa | ................ | G01N 21/9501 423/337 |
| 6,736,891 B1 | 5/2004 | Bice et al. | | |
| 6,749,823 B2 * | 6/2004 | Nozawa | ................ | C09C 1/3081 423/337 |
| 7,897,256 B2 * | 3/2011 | Kerner | ................ | C09C 3/12 428/405 |
| 9,527,874 B2 * | 12/2016 | Gottschalk-Gaudig | ................ | C07F 7/188 |
| 2002/0025288 A1 | 2/2002 | Nozawa et al. | | |
| 2010/0059704 A1 | 3/2010 | Davis et al. | | |
| 2016/0280557 A1 * | 9/2016 | Kim | ................ | C01B 33/1585 |

FOREIGN PATENT DOCUMENTS

| | | |
|---|---|---|
| CN | 103073927 | 5/2013 |
| CN | 106414328 | 2/2017 |
| CN | 106433223 | 2/2017 |
| CN | 108607306 | 10/2018 |
| CN | 208771089 | 4/2019 |
| EP | 1122212 | 8/2001 |
| WO | 2012111452 | 8/2012 |

* cited by examiner

COMBINED TREATMENT DEVICE AND METHOD FOR SURFACE MODIFICATION OF FUMED SILICA

CROSS-REFERENCE TO RELATED APPLICATION

This application is a continuation of international application of PCT application serial no. PCT/CN2020/081454 filed on Mar. 26, 2020, which claims the priority benefit of China application no. 202010105041.2, filed on Feb. 20, 2020 and the priority benefit of China application no. 202010105021.5, filed on Feb. 20, 2020. The entirety of each of the above mentioned patent applications is hereby incorporated by reference herein and made a part of this specification.

BACKGROUND

Technical Field

The disclosure relates to the field of chemical industry, in particular to a combined treatment device and method for surface modification of fumed silica.

Description of Related Art

The thermal hydrolysis process is one of the main technical methods for the preparation of high-purity ultra-fine powder materials. Fumed silica is synthesized by high-temperature hydrolysis and condensation of chlorosilane in hydrogen and oxygen flames. During the formation process of fumed silica particles, large amount of silanol groups (Si—OH) remains on the surface of silicon dioxide. On one hand, the existence of Si—OH can endow fumed silica higher surface activity, bringing a series of special properties such as reinforcement, thickening and thixotropy; however, it also brings some adverse effects, such as easy agglomeration of particles, difficulty in dispersion, and easy moisture absorption, etc., which has a great impact on the subsequent application of fumed silica. Therefore, surface modification of fumed silica is usually required.

Usually, surface modification is to select some organic compounds to react with the surface Si—OH of fumed silica, so as to induce the organic groups to the surface of fumed silica with chemically bond, which can reduce the moisture absorption of the powder and improve its dispersion in organic systems, etc. In this process, by-products that are not environmentally friendly and have different properties are often generated, and improper handling will bring risks to safety and environmental quality.

In addition, in the continuous hydrophobic modification process, since the entire production process is carried out continuously and the reaction time is relatively short, there will be some unreacted modifier. If the unreacted modifier after separated is discharged with the tail gas, it will reduce the utilization efficiency of the modifier, resulting in waste and increasing production costs and environmental risks. In U.S. Pat. No. 5,372,795, after the hydrophobic modification of the powder, the powder and the tail gas are separated by a cyclone. The tail gas containing the unreacted modifier, which is used as synthetic fumed silica raw materials is returned to the reaction furnace for synthesizing fumed silica. However, the return of unreacted modifier to the synthesis of hydrophilic fumed silica will reduce the ratio of fumed silica and modifier, so that the stability of the amount of hydrophilic fumed silica raw material and hydrophobic modifier (ratio) cannot be guaranteed, resulting in fluctuations in process parameters, such as the ratio of raw materials and combustion temperature. This in turn will cause fluctuations in the quality of the modified product (specific surface area, particle size and its distribution). In addition, in the method above, the unreacted modifier and the reaction by-products are returned to the system together, resulting in an increased content of by-products in the reaction furnace. The existence of by-products will affect the efficiency of the hydrophobic reaction and further cause fluctuation in the hydrophobic modification rate of the final product. In US2002/0025288A1, after hydrophobic modification, a part of fumed silica is added to the separated tail gas, so that they can react with the unreacted modifier. However, it cannot make 100% utilization of the modifier, and there is still a large exhaust gas treatment pressure.

The traditional hydrophobic modification method of fumed silica is basically the same as the above-mentioned patent, which recycles the unreacted modifier together with the tail gas, or directly transports the unreacted modifier and tail gas into the tail gas treatment system without recycling. These methods all cause fluctuations in product quality, affect the reaction efficiency and increase the exhaust gas treatment pressure in different level.

SUMMARY

Based on the above, one of the objects of the present disclosure is to provide a combined treatment method for surface modification of fumed silica, which significantly improves the utilization rate of unreacted modifiers and by-products, reduces the cost of by-product treatment, and improves the reaction efficiency and product quality.

The specific technical solutions are as follows.

A combined treatment method for surface modification of fumed silica comprises the following steps:

step (1) Two sets of modification devices are used for the combined treatment of fumed silica, each set of the modification device includes a reaction furnace and a gas separator; In the reaction furnace of each set of modification devices, the fumed silica is modified with a modifier, and two groups of modified fumed silica and exhaust gas are obtained respectively;

step (2) The exhaust gas from step (1) is separated respectively to obtain unreacted modifier and by-products. The obtained by-products are input into the reaction furnace of the other set of modification devices as reaction assistants to participate in the modification reaction, and the obtained unreacted modifier is returned to the reaction furnace of the original modification devices for repeated use.

The modifiers used in the two sets of modification devices are different from each other and are selected from organochlorosilanes, alkylsiloxanes, alkylsilazanes, hydroxyl-terminated polysiloxanes and cyclosiloxanes; wherein, the modifiers used in the two sets of modification devices are not all selected from hydroxyl-terminated polysiloxanes or cyclosiloxanes.

In some embodiments, the structural formula of the organochlorosilane is $R_m^1SiCl_{4-m}$; the structural formula of the alkylsiloxane is $R_m^2Si(OR^3)_{4-m}$; the structural formula of the alkylsilazane is

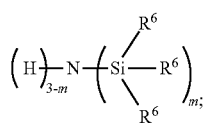

the structural formula of the hydroxyl-terminated polysiloxane is

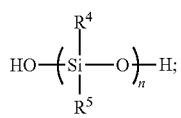

the structural formula of the cyclosiloxane is

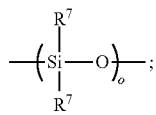

wherein, $R^1$ and $R^3$ are independently selected from C1~C6 alkyl;
$R^2$ is selected from C1~C22 alkyl;
$R^4$ and $R^5$ are independently selected from C1~C6 alkyl, C2~C6 alkenyl or C4~C8 aryl;
each $R^6$ and $R^7$ is independently selected from H, C1~C6 alkyl or C2~C6 alkenyl;
m is independently selected from the natural numbers from 1 to 3, n is selected from the natural numbers from 3 to 30, and o is selected from the natural numbers from 3 to 6.

In some embodiments, $R^1$ and $R^3$ are independently selected from methyl, ethyl, n-propyl, isopropyl, n-butyl, isobutyl, tert-butyl, n-pentyl or n-hexyl;

$R^2$ is selected from methyl, ethyl, n-propyl, isopropyl, n-butyl, isobutyl, tert-butyl, n-pentyl, n-hexyl or C7~C16 alkyl;

$R^4$ and $R^5$ are independently selected from methyl, ethyl, n-propyl, isopropyl, n-butyl, isobutyl, tert-butyl, n-pentyl, hexyl, vinyl, propenyl or phenyl;

each $R^6$ and $R^7$ is independently selected from H, methyl, ethyl, n-propyl, isopropyl, n-butyl, isobutyl, tert-butyl, n-pentyl, hexyl, vinyl, propenyl, butene or pentenyl;

m is independently selected from 1, 2 or 3, n is selected from the natural numbers from 3 to 20, and o is selected from 3, 4, 5 or 6.

In some embodiments, the organochlorosilane is selected from dimethyldichlorosilane or trimethylchlorosilane;

the alkylsiloxane is selected from dimethyldimethoxysilane, dimethyldiethoxysilane, diethyldimethoxysilane or diethyldiethoxysilane;

the hydroxyl-terminated polysiloxane is selected from hydroxyl-terminated polydimethylsiloxane, hydroxyl-terminated polymethylvinylsiloxane or hydroxyl-terminated polymethylphenylsiloxane;

the cyclosiloxane is selected from hexamethylcyclotrisiloxane, octamethylcyclotetrasiloxane, decamethylcyclopentasiloxane or dodecamethylcyclohexasiloxane.

In some embodiments, the modifier used in one set of the modification devices is organochlorosilane, and the modifier used in the other set of the modification devices is alkylsiloxane, alkylsilazane, hydroxyl terminated polysiloxane or cyclosiloxane.

In some embodiments, the modifier used in one set of the modification devices is alkylsiloxanes, while the modifier used in the other set of modification devices is alkylsilazane, hydroxyl-terminated polysiloxanes, oxane or cyclosiloxane.

In some embodiments, the modifier used in one set of the modification devices is alkylsilazane, while the modifier used in the other set of the modification devices is hydroxyl terminated polysiloxane or cyclosiloxane alkyl.

In some embodiments, the process of separating the exhaust gas in step (2) includes: separating the powder and gas in the exhaust gas for the first time, returning the powder obtained from the first separation to the reaction furnace of the original modification devices to continue the modification reaction; filtering the gas obtained from the first separation, separating the filtered gas into unreacted modifiers and by-products through the gas separation, and returning the powder obtained from the filtration for the primary separation.

In some embodiments, in step (1), under the fluidization of the inert gas, the vaporized modifier contacts and reacts with fumed silica; by adjusting the flow rate of the inert gas, the transit time for the powder passing through the reaction furnace is set 10-60 minutes.

In some embodiments, in each set of modification devices, the raw material mass ratio of the fumed silica and the modifier is 25-35:1-7;

In some embodiments, the reaction temperature of the modification reaction is 100-350° C.

In some embodiments, the exhaust gas in step (1) is input into the gas separator for gas separation to obtain unreacted modifier and by-products; the obtained unreacted modifier is returned to the reaction furnace of the original modification device for repeated use; the by-products are input into the reaction furnace of the other set of modification devices to participate in the modification reaction as reaction assistants.

In some embodiments, each set of modification devices also includes a separation member; before the exhaust gas is input into the gas separator, it is input into the separation member to separate the powder and gas. The separated powder is returned to the reaction furnace of the original modification devices for modification again, and the separated gas is input into the gas separator for gas separation.

In some embodiments, the separation member includes a cyclone separator and a bag filter; before the exhaust gas is input into the gas separator, it is input into the cyclone separator for primary separation. The powder obtained from the primary separation is returned to the reaction furnace of the original modification devices for further modification, and the gas obtained from the primary separation is input into the bag filter for filtration; the gas after filtration is input into the gas separator for gas separation, and the filtered powder is returned to the original cyclone separator for primary separation.

In some embodiments, each set of modification devices further comprises a feeding tank.

In some embodiments, each set of modification devices further comprises a venturi tube.

In some embodiments, each set of modification devices further comprises a feeding tank and a venturi tube. The fumed silica is fed into the reaction furnace for modification reaction through the feeding tank and the venturi tube.

In some embodiments, each set of modification devices further comprises a gasifier. The raw modifier or the unreacted modifier is vaporized by the gasifier, and then input into the reaction furnace for modification reaction.

In some embodiments, each set of modification devices further comprises a modifier storage tank. The modifier separated by the gas separator is transported to the modifier storage tank for storage, and then gradually input into the reaction furnace for reaction.

In some embodiments, each set of modification devices comprises at least two series-connected reaction furnaces. The fumed silica and the modifier are first subjected to modification reaction in the first reaction furnace, and the discharged fumed silica powder from the first reaction furnace is input into the second reaction furnace to continue the modification reaction;

The unreacted modifier obtained by separation in step (2) is vaporized and returned to the second reaction furnace of the original modification devices for repeated use; the by-products obtained by separation in step (2) is input into the first reactor of the other set of modification devices for modification reaction as reaction assistants.

In some embodiments, the obtained powder after one separation in the cyclone is returned to the second reaction furnace of the original modification devices to be modified again.

In some embodiments, each set of the modification devices includes three series-connected reaction furnaces. The fumed silica powder discharged from the second reaction furnace is input into the third reaction furnace to continue the modification reaction.

Another object of the present disclosure is to provide a combined treatment device for surface modification of fumed silica, which can be used for surface modification by the above-mentioned methods.

The specific technical solutions are as follows.

A combined treatment device for surface modification includes two sets of modification devices. Each set of modification devices includes a reaction furnace and a gas separator. The reaction furnace includes a first inlet, a second inlet, a first outlet for discharging powder, and a second outlet for discharging exhaust gas. The second outlet is communicated with the inlet of the gas separator; the outlet of the gas separator of the first set of modification devices is communicated with the first inlet of the reaction furnace of the second set of modification devices; the outlet of the gas separator of the second set of modification devices is communicated with the first inlet of the reaction furnace of the first set of modification devices.

Each set of modification devices further comprises a feeding tank, and the outlet of the feeding tank is communicated with the first inlet.

Each set of modification devices further comprises a venturi tube, and the powder enters the first inlet through the venturi tube.

Each set of modification devices further comprises a separation member, which includes a first separation outlet and a second separation outlet. The second outlet is communicated with the inlet of the separation member. The first separation outlet is communicated with the first inlet, and the second separation outlet is communicated with the inlet of the gas separator.

The separation member includes a cyclone separator and a bag filter. The cyclone separator includes a first cyclone outlet and a second cyclone outlet, and the bag filter includes a first filter outlet and a second filter outlet.

The inlet of the cyclone separator is communicated with the second outlet, and the first cyclone outlet is communicated with the first inlet to form the first separation outlet.

The second cyclone outlet is communicated with the inlet of the bag filter. The first filter outlet is communicated with the inlet of the cyclone separator, and the second filter outlet is communicated with the inlet of the gas separator to form the second separation outlet.

The outlet of the gas separator comprises a gas outlet and a liquid outlet, and the liquid outlet is communicated with the second inlet.

The gas outlet of the first set of modification devices is communicated with the first inlet of the reaction furnace of the second set of modification devices; The gas outlet of the second set of modification devices is communicated with the first inlet of the reaction furnace of the first set of modification devices.

Each set of modification devices further comprises a modifier storage tank, which is communicated with the liquid outlet.

Each set of modification devices comprises at least two reaction furnaces, each of which is provided with at least two first inlets.

The first outlet of the first reaction furnace is communicated with one of the first inlets of the second reaction furnace.

The first separation outlet of the separation member is communicated with another first inlet of the second reaction furnace.

The liquid outlet of the gas separator is communicated with the second inlet of the second reaction furnace.

The gas outlet of the first set of modification devices is communicated with one of the first inlets of the first reaction furnace of the second set of modification devices; the gas outlet of the second set of modification devices is communicated with one of the first inlets of the first reaction furnace of the first set of modification devices.

Each set of the modification devices comprises three reaction furnaces, and the first outlet of the second reaction furnace is communicated with one of the first inlets of the third reaction furnace. The first outlet of the third reaction furnace forms a product discharging port; all second outlets of the three reaction furnaces are communicated with the inlet of the separation member.

Compared with the prior art, the beneficial effects of the present disclosure are as follows:

The combined treatment device and method for surface modification of fumed silica of the present disclosure enables the by-products produced by each set of modification devices to be delivered into another modification unit as reaction assistant to participate in modification reaction by setting up two sets of modification devices connected in parallel, and controlling the types of modifiers in each set of modification devices, which mutually promoting the hydrophobic modification reaction of each other, and improving the efficiency of the hydrophobic modification reaction and the quality of the products; at the same time, the two groups of by-products are comprehensively utilized between the two sets of modification devices, which achieves the high efficiency, energy saving and zero emission of the entire surface modification combined treatment method. It greatly reduces the cost of exhaust gas treatment and has a good application prospect.

In addition, in the methods of the present disclosure, the unreacted modifier in the tail gas of each set of modification devices is separated, recovered and returned to the original reaction system for recycling. The recovered modifier does not contain by-products and will not affect the positive modification. The progress of the reaction not only significantly improves the utilization rate of the modifier, but also ensures the reaction efficiency.

BRIEF DESCRIPTION OF THE DRAWINGS

The drawings here show specific examples of the technical solutions of the present disclosure, form a part of the specification together with the specific embodiments, and are used to explain the technical solutions, principles and effects of the present disclosure.

Unless specified or otherwise defined, in different drawings, the same reference numerals represent the same or similar technical features, and the same or similar technical features may also be represented by different reference numerals.

Figure 1:
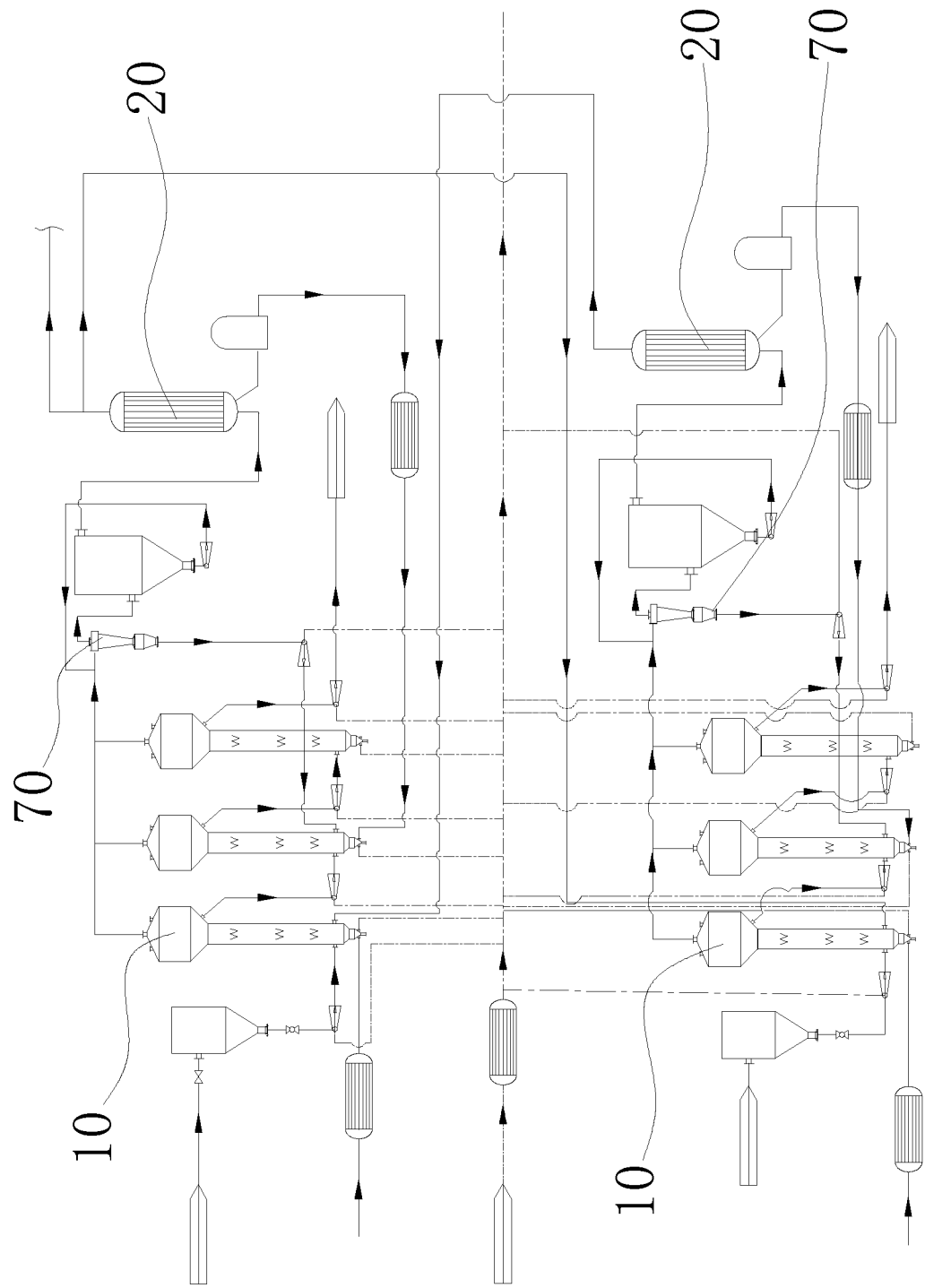
FIG. 1 is a schematic diagram of the connection structure of the two sets of modification devices according to the embodiment of the present disclosure.

Description of reference signs: 10, reaction furnace; 11, first inlet; 12, second inlet; 13, first outlet; 14, second outlet; 20, gas separator; 21, gas outlet; 22, liquid outlet; 30, modifier storage tank; 40, feeding tank; 50, venturi tube; 60, gasifier; 70, separation member; 71, first separation outlet; 72, second separation outlet; 73, cyclone separator; 731, first Cyclone outlet; 732, second cyclone outlet; 74, bag filter; 741, first filter outlet; 742, second filter outlet.

DESCRIPTION OF THE EMBODIMENTS

To make the present disclosure easy to understand, a more comprehensive description of the present disclosure will be given below with reference to the figures of the specification and embodiments. The preferred embodiments of the present disclosure are given below. However, the present disclosure may be acquired in many different ways, and is not limited to the embodiments as described here. These embodiments are provided so that the content disclosed by the present disclosure may be more thoroughly and comprehensively understood.

Unless otherwise defined, all technical and scientific terms as used herein have the same meanings as those usually understood by a person skilled in the art of the present disclosure. The terms used in the description of the present disclosure are for description of the specific embodiments only and are not intended to limit the present disclosure. The term "and/or" as used herein includes any or all combinations of one or more relevant listed items. In the case of combining the technical solutions of the present disclosure with realistic scenarios, all technical and scientific terms used herein may also have meanings corresponding to achieving the purposes of the technical schemes of the present disclosure.

Unless specifically stated or otherwise defined, "first, second . . . " used in the description is only used to distinguish names, and does not represent a specific number or order.

It should be noted that when a component is considered to be "secured" to another component, it can be directly secured to said another component, or it can be secured to said another component through a centered component; when a component is considered to be "connected" to another component, it can be directly connected to said another component, or be connected to said another component through a centered component at the same time; When a component is considered to be "installed on" another component, it can be directly installed on said another component, or be installed on said another component through a centered component at the same time; When an component is considered to "set on" another component, it can be directly set on said another component, or be set on said another component through a central component at the same time.

This embodiment provides a combined treatment method for surface modification of hydrophilic fumed silica, comprising the following steps:

(1) Two sets of modification devices are used to jointly treat fumed silica, each set of devices includes a reaction furnace and a gas separator; the fumed silica is modified with a modifier in the reaction furnace of each set of modification devices, and two groups of modified fumed silica and exhaust gas are obtained respectively;

(2) The exhaust gas obtained in step (1) is separated respectively to obtain unreacted modifier and by-products, and the obtained by-products are input into the reaction furnace of the other set of modification devices to participate in the modification reaction as reaction assistants, and the obtained unreacted modifier is returned to the reaction furnace of the original modification device for repeated use;

the modifiers used in the two sets of modification devices are different from each other and are selected from organochlorosilanes, alkylsiloxanes, alkylsilazanes, hydroxyl-terminated polysiloxanes and cyclosiloxanes; wherein, the modifiers used in the two sets of modification devices are not all selected from hydroxyl-terminated polysiloxanes or cyclosiloxanes.

Figure 4:
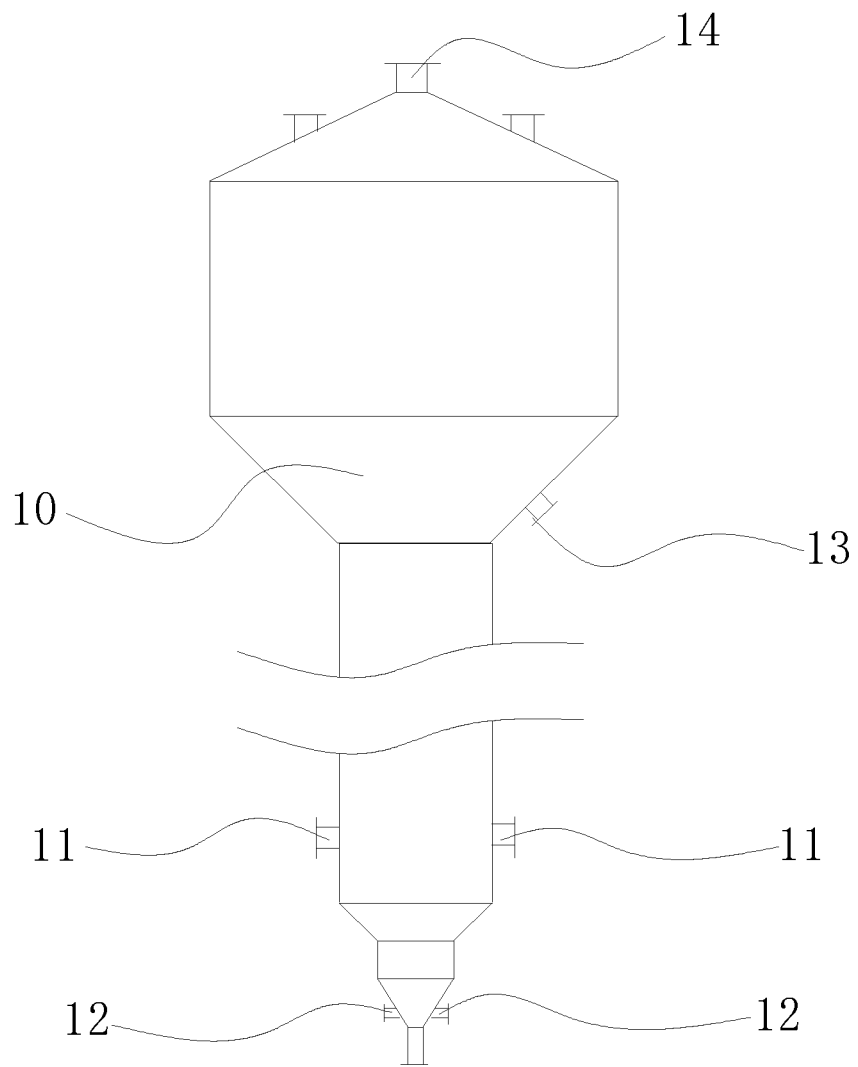
FIG. 4 is a schematic diagram of the structure of the reaction furnace of the embodiment of the present disclosure.

The combined treatment device for surface modification used in the combined treatment method for surface modification is shown in FIG. 1 and FIG. 4, comprising two sets of modification devices, each set of modification devices includes a reaction furnace 10 and a gas separator 20. The reaction furnace 10 includes a first inlet 11, a second inlet 12, a first outlet 13 for discharging powder, and a second outlet 14 for discharging exhaust gas. The second outlet 14 is communicated with the inlet of the gas separator 20; The outlet 20 of the gas separator of the first set of modification devices is communicated with the first inlet 11 of the reaction furnace 10 of the second set of modification devices; The outlet 20 of the gas separator of the second set of modification devices is communicated with the first inlet 11 of the reaction furnace 10 of the first set of modification devices.

The fumed silica powder to be modified is introduced into the two sets of modification devices through the first inlet 11, and then different modifiers are introduced through the second inlet 12. The carrier gas is introduced into the reaction furnace 10, and the fumed silica reacts with the modifier in the reaction furnace 10 for the surface modification of the fumed silica. After the reaction, the fumed silica powder is discharged through the first outlet 13. At this time, the surface modification of the fumed silica is completed, and the collection treatment is performed. The exhaust gas is discharged through the second outlet 14, and then enters the gas separator 20, which separates the unreacted modifier and the by-products after the modification, wherein the by-products are vaporized and discharged through the outlet of the gas separator 20. The by-products of the first set of modification devices enter the reaction furnace 10 of the second set of modification devices, and the by-products of the second set of modification devices enter the reaction furnace 10 of the first set of modification devices.

Specifically, the structural formula of the organochlorosilane is $R_m^1SiCl_{4-m}$; the structural formula of the alkylsiloxane is $R_m^2Si(OR^3)_{4-m}$; the structural formula of the alkylsilazane is

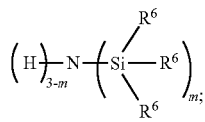

the structural formula of the hydroxyl-terminated polysiloxanes is

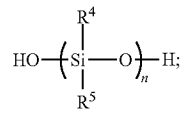

the structural formula of the cyclosiloxane is

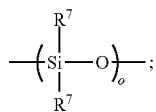

wherein,
$R^1$ and $R^3$ are independently selected from C1~C6 alkyl;
$R^2$ is selected from C1~C22 alkyl;
$R^4$ and $R^5$ are independently selected from C1~C6 alkyl, C2~C6 alkenyl or C4~C8 aryl;
each $R^6$ and $R^7$ is independently selected from H, C1~C6 alkyl or C2~C6 alkenyl;
m is independently selected from the natural numbers of 1 to 3; n is selected from the natural numbers of 3 to 30; and o is selected from the natural numbers of 3 to 6.

In the present disclosure, the by-products (main components of tail gas) generated by different modifiers in the modification reaction process are different. The by-products produced by organochlorosilane as modifiers are mainly HCl (as shown in formula (1)); the by-products produced by alkylsiloxanes as modifiers are mainly alcohols (as shown in formula (2)); the by-products produced by alkylsilazane as modifiers are mainly NH3 (as shown in formula (3)); the by-products produced by hydroxyl-terminated polysiloxane or cyclosiloxane as modifiers are mainly $H_2O$ (as shown in formula (4) and formula (5)). Refer to the following formulas:

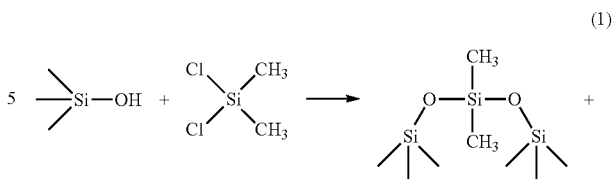

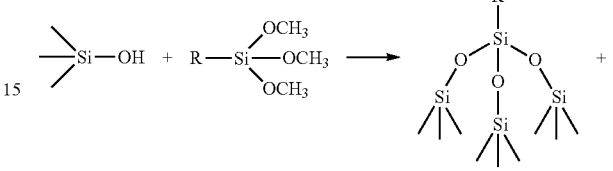

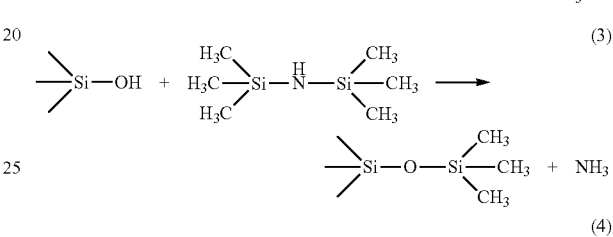

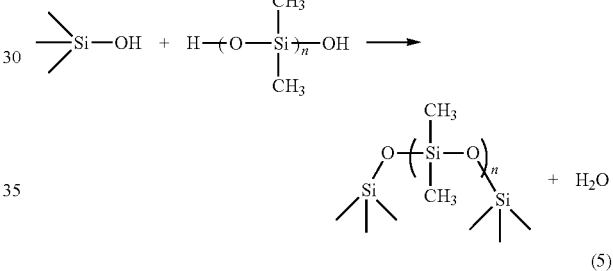

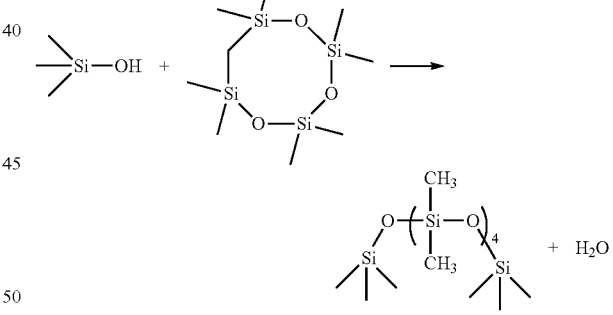

The inventors of the present disclosure found that, in the two sets of modification devices connected in parallel, when two different types of modifiers are selected from the above four types of modifiers to cooperate with each other, the by-products generated by one set of modification devices are input into the other set of modification devices. On one aspect, zero emission and zero pollution can be achieved, which greatly reduces the treatment cost of by-products; on the other aspect, the by-products of one set of modification devices can be used as the reaction assistants for the other set of modification devices, promoting the modification reaction in the other set of modification devices through various mechanisms, which ultimately improves the reaction efficiency and product quality. The specific mechanisms include at least: (1) By-products $H_2O$, HCl, $NH_3$ and alcohols can improve the reactivity of silanols and activate them, thereby promoting the reaction between organosilanes and silanols. (2) If the modifier is organochlorosilane, the produced HCl will be adsorbed on the surface of the powder. While the by-products alcohols, $NH_3$, $H_2O$ and HCl of the modifiers, such as alkyl siloxane, alkyl silazane, and hydroxy-terminated siloxane, can help to remove the adsorption of HCl on the surface of the powder which improves the actual contact area between the powder and the reactant as well as the purity of the powder. In practical applications, it shows that the increase of pH value of the finished products may help to reduce the energy consumption of desorption. (3) When the modifier of one set of modification devices is alkylsiloxane, hydroxyl-terminated polysiloxane or cyclosiloxane, the modifier of the other set of modification devices is organochlorosilane. Alcohols or $H_2O$, the by-products of one set of modification devices can be used as reaction assistants to undergo hydrolysis or alcoholysis with organochlorosilane, the modifier of the other set of modification devices. The obtained intermediates are dehydrated or dealcoholized with fumed silica, which promotes the modification reaction of the other set of modification devices and improves the reaction efficiency. In practical applications, it shows that the amount of modifier can be reduced, or when at the same amount, the modification efficiency of the finished product is improved (the carbon content is increased).

For example, when the modifier introduced into the first set of modification devices is dimethyldichlorosilane, and the modifier introduced into the second set of modification devices is hexamethyldisilazane, the by-products generated by the reaction of the two modifiers with the silanols on the surface of fumed silica are hydrogen chloride and ammonia, respectively. Its advantages include at least: (1) The by-products hydrogen chloride and ammonia generated by the two reactions can mutually promote the reaction between each other's modifier and silanol (i.e. hydrogen chloride can promote the reaction between hexamethyldisilazane and silanol; while ammonia can promote the reaction of dimethyldichlorosilane with silanol); (2) The two by-products can also promote the removal of by-products in the reaction process of each other, and therefore reduce the concentration of by-products in the reaction process. That is, the hydrogen chloride generated by the first set of modification devices is in the reaction furnace 10, and reacts with the ammonia gas generated in the second set of modification devices to produce ammonium chloride; the ammonia gas generated by the second set of modification devices is in the reaction furnace 10, and reacts with the hydrogen chloride produced in the first set of modification devices to produce ammonium chloride. The combined treatment device for surface modification not only improves the efficiency of the surface modification reaction of fumed silica, but also enables different by-products to react with each other, thereby reducing the difficulty of treatment for by-products. Moreover, the content of by-products in the reaction system is reduced, and therefore the progress of the positive modification reaction is promoted.

Figure 2:
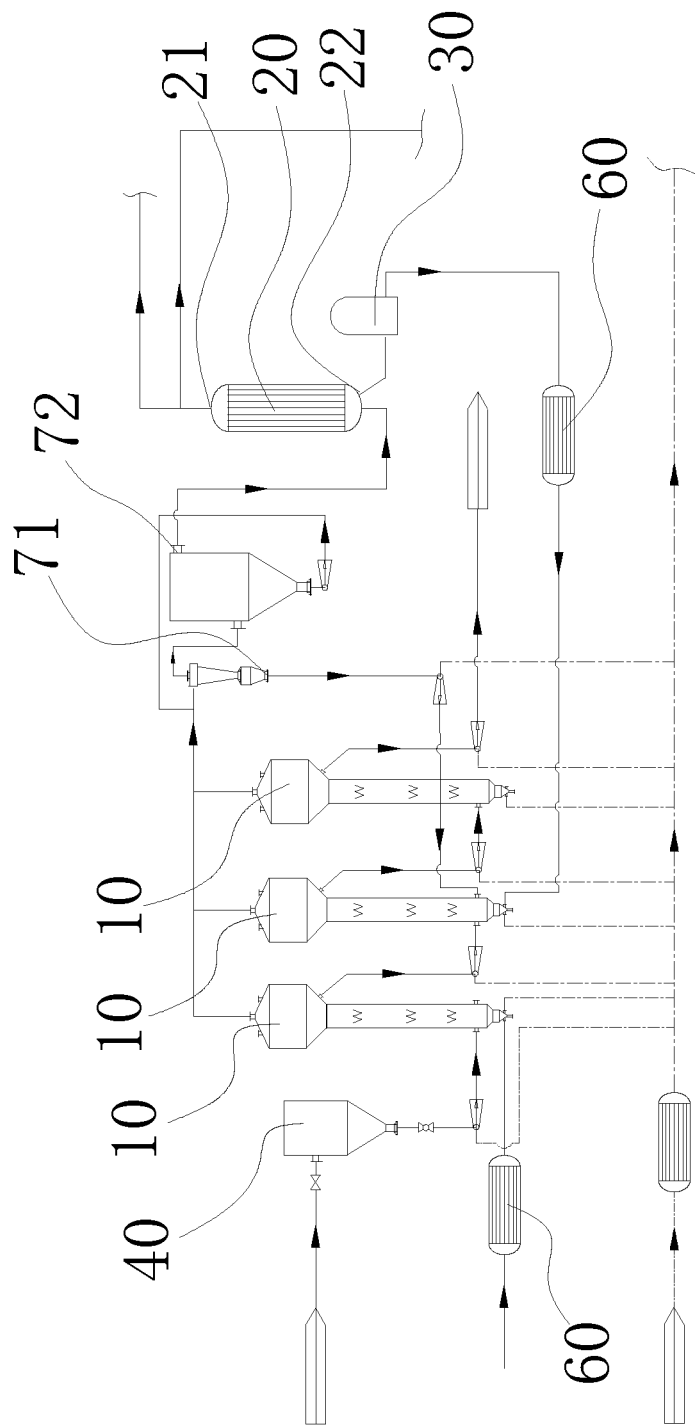
FIG. 2 is a schematic diagram of the connection structure of the single set modification device of the embodiment of the present disclosure.

When the fumed silica powder is transported, nitrogen is used as a carrier gas, which is introduced into the reaction furnace 10 as a carrier gas and a protective gas, which enables the fumed silica powder to be fluidized and react with the modifiers. The dotted lines in FIG. 1 and FIG. 2 represent the nitrogen delivery pipeline. The modifiers, fumed silica powder and nitrogen are all transported through pipelines. Moreover, a valve is arranged on the pipeline to control the flow of the objects.

Figure 3:
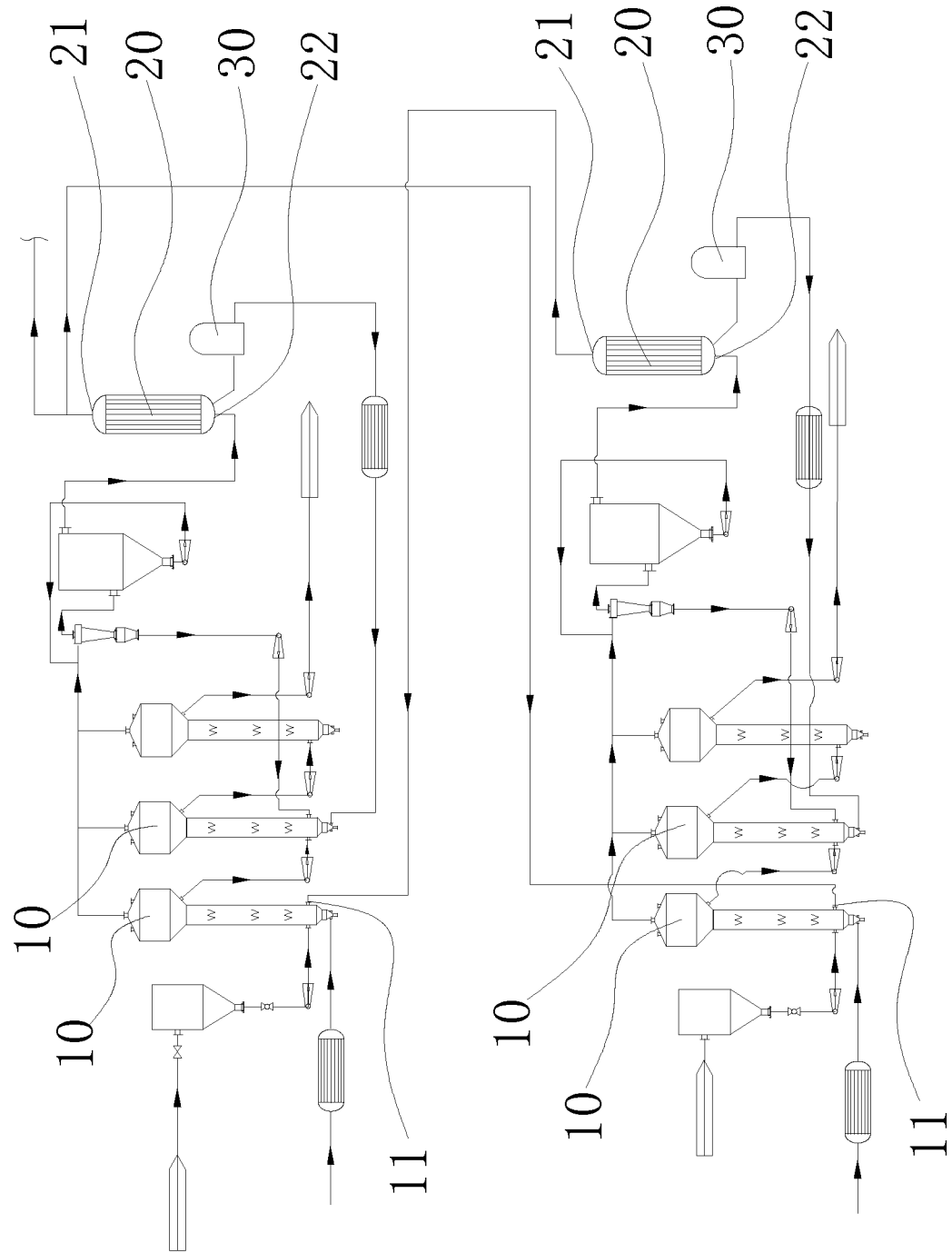
FIG. 3 is a schematic diagram of the connection structure of two sets of modification devices for removing nitrogen gas according to the embodiment of the present disclosure.

As shown in FIG. 2 and FIG. 3, each set of modification devices further includes a separation member 70, which includes a first separation outlet 71 and a second separation outlet 72. The second outlet 14 is communicated with the inlet of the separation member 70. The first separation outlet 71 is communicated with the first inlet 11, and the second separation outlet 72 is communicated with the inlet of the gas separator 20. The exhaust gas discharged from the second outlet 14 of the reaction furnace 10 contains partial fumed silica powder, unreacted modifiers and by-products of the reaction, and the partial fumed silica powder is separated from the first separation outlet 71 through the separation member 70, and then is passed into the reaction furnace 10 through the first inlet 11 to recycle for reaction, which avoids waste and ensures the uniformity of the product reaction. The by-products and unreacted modifiers are discharged through the second separation outlet 72 into the gas separator 20, where the by-products and the unreacted modifiers are treated.

Figure 6:
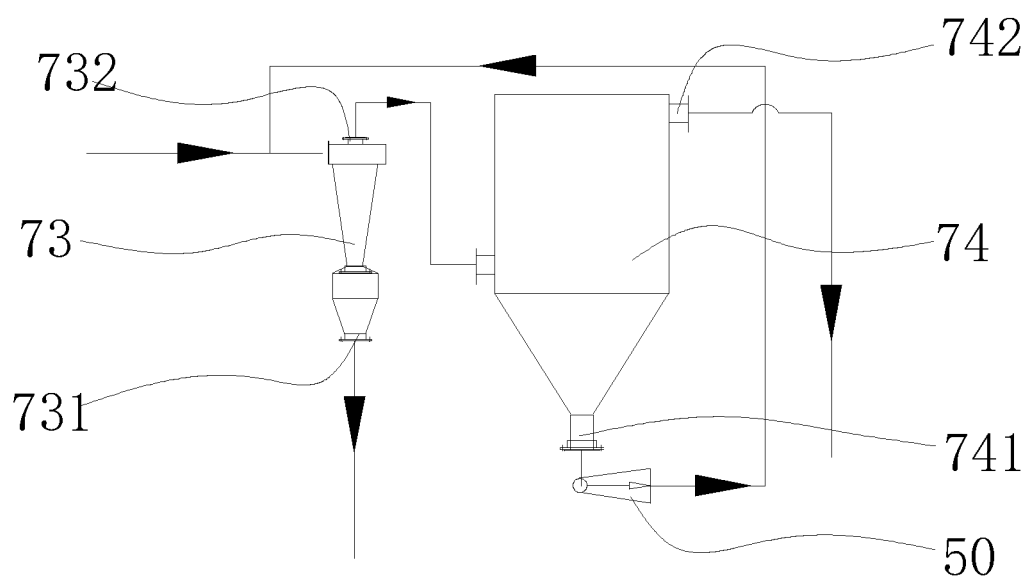
FIG. 6 is a schematic diagram of a connection structure of a separation member according to an embodiment of the present disclosure.

As shown in FIG. 6, specifically, the separation member 70 includes a cyclone separator 73 and a bag filter 74. The cyclone separator 73 includes a first cyclone outlet 731 and a second cyclone outlet 732, and the bag filter 74 includes a first filter outlet 741 and a second filter outlet 742; the inlet of the cyclone separator 73 is communicated with the second outlet 14, and the first cyclone outlet 731 is communicated with the first inlet 11 to form the first separation outlet 71; the second cyclone outlet 732 is communicated with the inlet of the bag filter 74, the first filter outlet 741 is communicated with the inlet of the cyclone separator 73, and the second filter outlet 742 is communicated with the inlet of the gas separator 20 to form the second separation outlet 72. Thereby, the solid and gas are separated by the cyclone separator 73, and the fumed silica powder is separated when the powder passes through the first cyclone outlet 731, and then passes into the reaction furnace 10 through the first inlet 11. While the gaseous modifiers, nitrogen and the by-products enter into the bag filter 74 through the second cyclone outlet 732. The unseparated fumed silica powder is further separated through the bag filter 74, and then passes through the first filter outlet 741. Then it is discharged and separated again to the inlet of the cyclone separator 73, and finally it enters into the reaction furnace 10; while the nitrogen and the by-products separated by the bag filter 74 are discharged through the second separation outlet 72 and enter into the gas separator 20. Thereby, fumed silica is fully recycled by using the two-stage filtration, and then returned to the reaction furnace 10 for fully reaction.

As shown in FIG. 2 and FIG. 3, the outlet of the gas separator 20 includes a gas outlet 21 and a liquid outlet 22, and the liquid outlet 22 is communicated with the second inlet 12; the gas outlet 21 of the first set of modification devices is communicated with the first inlet 11 of the reaction furnace 10 of the second set of modification devices; the gas outlet 21 of the second set of modification devices is communicated with the first inlet 11 of the reaction furnace 10 of the first set of modification devices. The gas passing through the separation member 70 includes modifiers, nitrogen and by-products, and it enters into the gas separator 20. By controlling different temperatures, gas-liquid separation and gas-gas separation are achieved. The liquid, which contains modifiers, is discharged through the liquid outlet 22, while nitrogen and the by-products are discharged through the gas outlet 21, where the by-products or nitrogen or their mixture are discharged, and then enter into another set of reaction furnace 10.

Wherein, two pipes are provided on the gas outlet 21, and each pipe is provided with a valve, one of which is a by-products discharging pipe connected to another set of modification devices, and the other is a nitrogen discharging pipe. Shut off the by-products discharging pipeline, and then separate and discharge nitrogen through the gas separator 20. At this time, only nitrogen can be discharged; similarly, shut off the nitrogen discharge pipeline and only by-products can be discharged into the reaction furnace 10 of another set of reforming devices through the separation of the gas separator 20.

As shown in FIG. 2 and FIG. 3, each set of modification devices further includes a modifier storage tank 30, which is communicated with the liquid outlet 22. The liquid modifiers separated by the gas separator 20 are firstly transported to the modifier storage tank 30 for storage, and then are gradually input to the reaction furnace 10 for reaction, which enables recycling and full use of the modifiers.

As shown in FIG. 1 and FIG. 2, each set of modification devices further includes a feeding tank 40, the outlet of which is communicated with the first inlet 11. The feeding tank 40 can store the powder to play a buffering role and improve the uniformity and accuracy of the powder feeding. A valve is set between the outlet of the feeding tank 40 and the first inlet 11 to control and separate the powder feeding.

Figure 5:
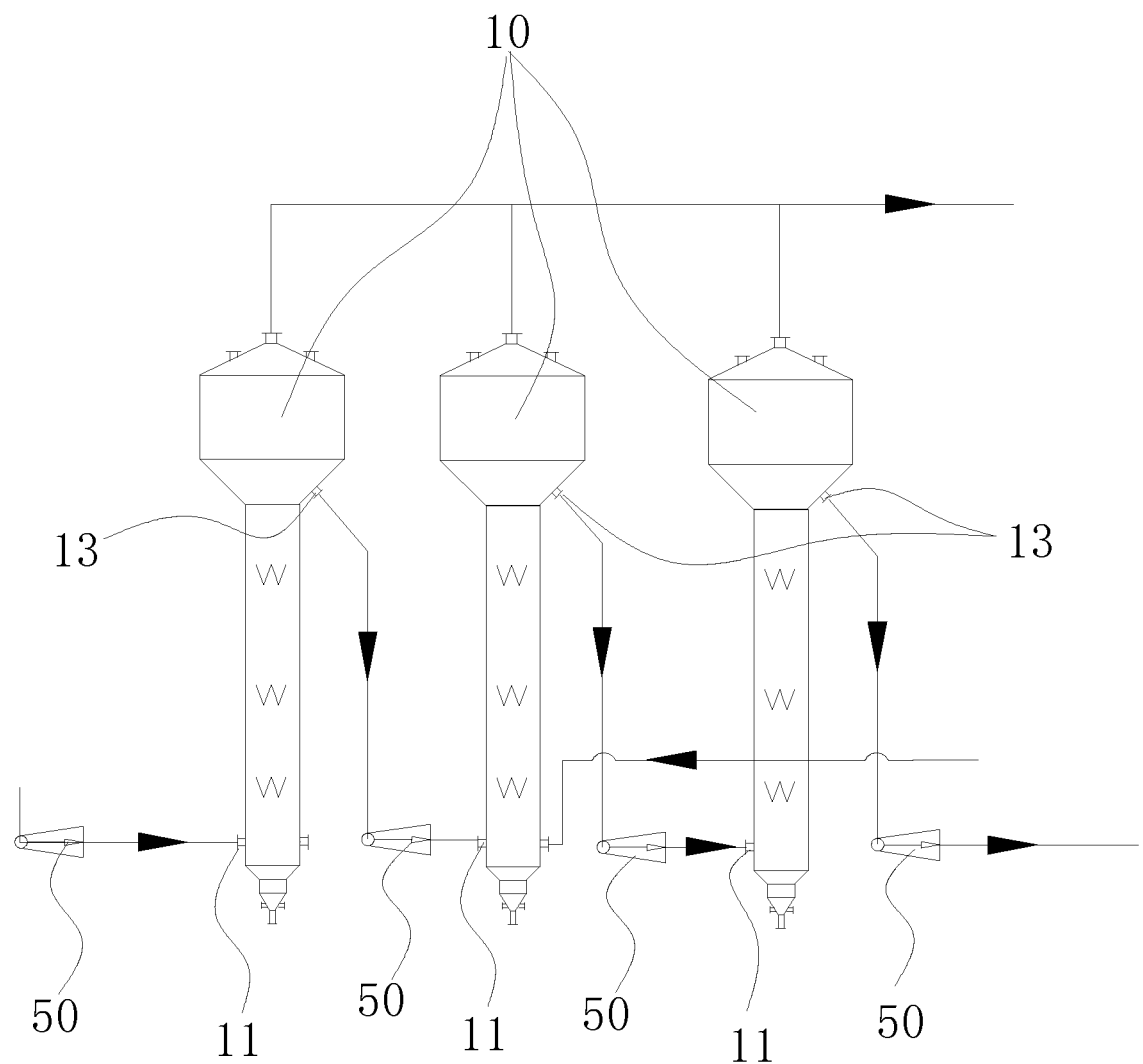
FIG. 5 is a schematic diagram of the connection structure of three reaction furnaces according to an embodiment of the present disclosure.

As shown in FIG. 5, each set of modification devices further includes a venturi tube 50, and the powder enters the first inlet 11 through the venturi tube 50. The fumed silica powder is passed into the reaction furnace 10 through the adsorption of the venturi tube 50, which effectively prevents the fumed silica powder from agglomerating.

As shown in FIG. 2, each set of modification devices further includes a gasifier 60, which is communicated with the second inlet 12. The modifiers are input into the gasifier 60, and then through the vaporization of the gasifier 60, the vaporized modifiers are discharged from the outlet and enters into the reaction furnace 10, which helps to increase the contact area of the fumed silica powder and improve the reaction rate.

As shown in FIG. 3 to FIG. 5, each set of modification devices includes at least two reaction furnaces 10, and each of the reaction furnaces 10 is provided with at least two first inlets 11; the first outlet 13 of the first reaction furnace 10 is communicated with one first inlet 11 of the second reaction furnace 10; The first separation outlet 71 of the separation member 70 is communicated with the other first inlet 11 of the second reaction furnace 10; the liquid outlet 22 of the gas separator 20 is communicated with the second inlet 12 of the second reaction furnace 10; The gas outlet 21 of the first set of modification devices is communicated with one first inlet 11 of the first reaction furnace 10 of the second set of modification devices; The gas outlet 21 of the second set of modification devices is communicated with one first inlet 11 of the first reaction furnace 10 of the first set of modification devices.

In the same set of modification devices, the raw fumed silica powder and the modifiers carry out modification reaction in the first reaction furnace 10. After the reaction in the first reaction furnace 10, there will still be a lot of unreacted fumed silica powder. The fumed silica in the first reaction furnace 10 is discharged through the first outlet 13, then it enters into the second reaction furnace 10 through the first inlet 11 of the second reaction furnace 10, while the recycled fumed silica powder is also introduced into the other first inlet 11 of the second reaction furnace 10, and the unreacted fumed silica powder in the second reaction furnace 10 further fully reacts with the unreacted modifiers introduced through the second inlet 12. Therefore, not only the unreacted modifiers are fully utilized, but also the unreacted fumed silica in the first reaction furnace 10 is fully modified, and moreover, the feed ratio of the modifiers and fumed silica in the two reaction furnaces is kept constant. Meanwhile, the by-products of the second set of modification devices are passed into the first reaction furnace 10 of the first set of modification devices. As the first reaction furnace 10 is the starting point of the modification reaction, and the reaction produces the most by-products, so a reaction assistant is more needed to play its role to remove the by-products and promote the positive modification reaction.

As shown in FIG. 5, in this embodiment, each set of the modification devices includes three reaction furnaces 10. The first outlet 13 of the second reaction furnace 10 is communicated with a first inlet 11 of the third reaction furnace 10; and the first outlet 13 of the third reaction furnace 10 forms a product discharging outlet; the second outlets 14 of the three reaction furnaces 10 are all communicated with the inlets of the separation member 70. Through this connection arrangement, the fumed silica reacted in the second reaction furnace 10 can be passed into the third reaction furnace, and most of the fumed silica entering the third reaction furnace 10 undergoes a surface hydrophobic modification reaction with only a small amount of unreacted remaining. While at the same time, a small amount of modifiers will also attach to the fumed silica powder, and then continue to react in the third reaction furnace 10, and at the same time, the low molecules adsorbed on the surface of the powder are removed (Low molecules are adsorbed on the surface of the powder by physical adsorption. In the third reaction furnaces, the temperature is relatively high, and desorption is performed through high temperature). After the reaction in the third reaction furnace 10, the substantially completely hydrophobically modified fumed silica powder is discharged through the first outlet 13 of the third reaction furnace 10, which is the product discharging port, and the output of the product is completed.

Recycling and re-reaction of the fumed silica powder and the modifiers, helps to control the sufficient reaction between the fumed silica and the modifiers. As the fumed silica powder and the modifiers are recycled until they are completely reacted, the reaction is completed approximately 100%. When the input of fumed silica and modifier is controlled, the ratio of fumed silica and modifiers in each set of modification devices can be stabilized. So, the stability of product quality can be achieved, and moreover, the raw materials can be fully utilized.

The following first reaction furnace 10 refers to the first reaction furnace where the unsurface-modified fumed silica is passed; The second reaction furnace 10 refers to the one where the fumed silica modified by the first reaction furnace 10 is passed; The third reaction furnace 10 refers to the one where the fumed silica after being modified by the second reaction furnace 10 is passed.

In this embodiment, the transportation of the fumed silica powder is all conveyed through the venturi tube 50.

Wherein: The aforementioned "first, second, third . . . " does not represent a specific number and order, but is only used to distinguish names.

As each set of modification devices mentioned above is the same, only one set devices is described when describing the internal structure of the modification devices.

The method of the present disclosure will be further described below in conjunction with specific embodiments.

The following "1-1 furnace" refers to the first reaction furnace of the first set of modification devices; the "1-2 furnace" refers to the second reaction furnace of the first set of modification devices; the "1-3 furnace" refers to the third reaction furnace of the first set of modification devices; the "2-1 furnace" refers to the first reaction furnace of the second set of modification devices; the "2-2 furnace" refers to the second reaction furnace of the second set of modification devices; the "2-3 furnaces" refers to the third reaction furnace of the second set of modification devices;

Example 1

In the parallel-connected modification devices shown in FIG. 1, the hydrophobic modifier of the first set of modification devices is Dimethyldichlorosilane (DMDC), and the hydrophobic modifier of the second set of modification devices is Hexamethyldisilazane (HMDS); the specific surface area of hydrophilic fumed silica is 200 m$^2$/g, and the carrier gas is nitrogen. By adjusting the amount of nitrogen, the time for the powder to pass through the reaction furnace is maintained 10~60 mins. The ratio of the respective raw materials and the main process parameters are shown in Table 1. The direction of each material is shown in FIG. 1. The unreacted modifiers are first separated from the reaction by-products, and the unreacted modifiers are returned to the fluidized bed reaction furnace of the original devices to continue the reaction; The reaction by-product HCl separated from the first set of modification devices is transported to the fluidized bed reaction furnace of the second set of modification devices as a reaction assistant of the second set of modification devices; and the reaction by-product NH$_3$ separated from the second set of modification devices is sent to the fluidized bed reaction furnace of the first set of modification devices as a reaction assistant of the first set of modification devices. The final hydrophobic fumed silica samples obtained from the two sets of modification devices are I-1 and I-2, respectively.

TABLE 1

Raw material ratio and main process parameters in Example 1.

| Device | Hydrophobic Modification Device 1 | | | Hydrophobic Modification Device 2 | | |
|---|---|---|---|---|---|---|
| Raw Material | SiO$_2$ | DMDC | N$_2$ | SiO$_2$ | HMDS | N$_2$ |
| Feed rate | 30 kg/h | 2.2 kg/h | 75 kg/h | 30 kg/h | 2.5 kg/h | 75 kg/h |
| Process parameters | Furnace 1-1 | Furnace 1-2 | Furnace 1-3 | Furnace 2-1 | Furnace 2-2 | Furnace 2-3 |
| Temperature (° C.) | 100-180 | 130-200 | 180-250 | 150-200 | 180-250 | 220-300 |
| Product | | I-1 | | | I-2 | |

Example 2

In the parallel-connected modification devices shown in FIG. 1, the hydrophobic modifier of the first set of modification devices is Dimethyldichlorosilane (DMDC), and the hydrophobic modifier of the second set of modification devices is Dimethyldimethoxysilane (DMDS); the specific surface area of hydrophilic fumed silica is 200 m$^2$/g, and the carrier gas is nitrogen. By adjusting the flow rate of nitrogen, the time for the powder to pass through the reaction furnace is maintained for 10~60 mins. The ratio of the respective raw materials and the main process parameters are shown in Table 2. The direction of each material is shown in FIG. 1. The unreacted modifiers are first separated from the reaction by-products, and the unreacted modifiers are returned to the respective fluidized bed reaction furnace to continue the reaction; the reaction by-product HCl separated from the first set of modification devices is transported to the fluidized bed reaction furnace of the second set of modification devices as a modification aid of the second set of modification devices; The reaction by-product CH$_3$OH separated from the second set of modification devices is sent to the fluidized bed reaction furnace of the first set of modification devices as a modification aid for the first set of modification devices. The final hydrophobic fumed silica samples obtained from the two sets of modification devices are II-1 and II-2, respectively.

TABLE 2

Raw material ratio and main process parameters in Example 2.

| Device | Hydrophobic Modification Device 1 | | | Hydrophobic Modification Device 2 | | |
|---|---|---|---|---|---|---|
| Raw Material | SiO$_2$ | DMDC | N$_2$ | SiO$_2$ | DMDS | N$_2$ |
| Feed rate | 30 kg/h | 2.2 kg/h | 75 kg/h | 30 kg/h | 2.1 kg/h | 78 kg/h |

TABLE 2-continued

Raw material ratio and main process parameters in Example 2.

| Device | Hydrophobic Modification Device 1 | | | Hydrophobic Modification Device 2 | | |
|---|---|---|---|---|---|---|
| Process parameters | Furnace 1-1 | Furnace 1-2 | Furnace 1-3 | Furnace 2-1 | Furnace 2-2 | Furnace 2-3 |
| Temperature (° C.) | 100-180 | 130-200 | 180-250 | 120-200 | 150-220 | 200-300 |
| Product | | II-1 | | | II-2 | |

Example 3

In the parallel-connected modification devices shown in FIG. 1, the hydrophobic modifier of the first set of modification devices is dimethyldichlorosilane (DMDC), and the hydrophobic modifier of the second set of modification devices is Hydroxy-terminated polydimethylsiloxane (PDMS); the specific surface area of hydrophilic fumed silica is 200 m²/g, and the carrier gas is nitrogen. By adjusting the flow rate of nitrogen, the time for the powder to pass through the reaction furnace is maintained for 10~60 mins. The ratio of the respective raw materials and the main process parameters are shown in Table 3. The direction of each material is shown in FIG. 1. The unreacted modifiers are first separated from the reaction by-products, and the unreacted modifiers are returned to the respective fluidized bed reaction furnace to continue the reaction; The reaction by-product HCl separated from the first set of modification devices is transported to the fluidized bed reaction furnace of the second set of modification devices as a modification aid of the second set of modification devices; The reaction by-product $H_2O$ separated from the second set of modification devices is sent to the fluidized bed reaction furnace of the first set of modification devices as a modification aid for the first set of modification devices. The final hydrophobic fumed silica samples obtained from the two sets of modification devices are III-1 and III-2, respectively.

TABLE 3

Raw material ratio and main process parameters in Example 3

| Device | Hydrophobic Modification Device 1 | | | Hydrophobic Modification Device 2 | | |
|---|---|---|---|---|---|---|
| Raw Material | $SiO_2$ | DMDC | $N_2$ | $SiO_2$ | PDMS | $N_2$ |
| Feed rate | 30 kg/h | 2.2 kg/h | 75 kg/h | 30 kg/h | 5 kg/h | 82 kg/h |
| Process parameters | Furnace 1-1 | Furnace 1-2 | Furnace 1-3 | Furnace 2-1 | Furnace 2-2 | Furnace 2-3 |
| Temperature (° C.) | 100-180 | 130-200 | 180-250 | 180-250 | 200-280 | 250-350 |
| Product | | III-1 | | | III-2 | |

Example 4

In the parallel-connected modification devices shown in FIG. 1, the hydrophobic modifier of the first set of modification devices is Hydroxy-terminated polydimethylsiloxane (PDMS), and the hydrophobic modifier of the second set of modification devices is Hexamethyldisilazane (HMDS); the specific surface area of hydrophilic fumed silica is 200 m²/g, and the carrier gas is nitrogen. By adjusting the flow rate of nitrogen, the time for the powder to pass through the reaction furnace is maintained for 10~60 mins. The ratio of the respective raw materials and the main process parameters are shown in Table 4. The direction of each material is shown in FIG. 1. The unreacted modifiers are first separated from the reaction by-products, and the unreacted modifiers are returned to the respective fluidized bed reaction furnace to continue the reaction; the reaction by-product $H_2O$ separated from the first set of modification devices is transported to the fluidized bed reaction furnace of the second set of modification devices as a modification aid of the second set of modification devices; the reaction by-product $NH_3$ separated from the second set of modification devices is sent to the fluidized bed reaction furnace of the first set of modification devices as a modification aid for the first set of modification devices. The final hydrophobic fumed silica samples obtained from the two sets of modification devices are Iv-1 and Iv-2, respectively.

TABLE 4

Raw material ratio and main process parameters in Example 4

| Device | Hydrophobic Modification Device 1 | | | Hydrophobic Modification Device 2 | | |
|---|---|---|---|---|---|---|
| Raw Material | SiO$_2$ | PDMS | N$_2$ | SiO$_2$ | HMDC | N$_2$ |
| Feed rate | 30 kg/h | 5 kg/h | 82 kg/h | 30 kg/h | 2.5 kg/h | 75 kg/h |
| Process parameters | Furnace 1-1 | Furnace 1-2 | Furnace 1-3 | Furnace 2-1 | Furnace 2-2 | Furnace 2-3 |
| Temperature (° C.) | 180-250 | 200-280 | 250-350 | 150-200 | 180-250 | 220-300 |
| Product | | IV-1 | | | IV-2 | |

Example 5

In the parallel-connected modification devices shown in FIG. 1, the hydrophobic modifier of the first set of modification devices is Dimethyldimethoxysilane (DMDS), and the hydrophobic modifier of the second set of modification devices is Hexamethyldisilazane (HMDS); the specific surface area of hydrophilic fumed silica is 200 m$^2$/g, and the carrier gas is nitrogen. By adjusting the flow rate of nitrogen, the time for the powder to pass through the reaction furnace is maintained for 10~60 mins. The ratio of the respective raw materials and the main process parameters are shown in Table 5. The direction of each material is shown in FIG. 1. The unreacted modifiers are first separated from the reaction by-products, and the unreacted modifiers are returned to the respective fluidized bed reaction furnace to continue the reaction; the reaction by-product CH$_3$OH separated from the first set of modification devices is transported to the fluidized bed reaction furnace of the second set of modification devices as a modification aid of the second set of modification devices; The reaction by-product NH$_3$ separated from the second set of modification devices is sent to the fluidized bed reaction furnace of the first set of modification devices as a modification aid for the first set of modification devices. The final hydrophobic fumed silica samples obtained from the two ss of modification devices are V-1 and V-2, respectively.

TABLE 5

Raw material ratio and main process parameters in Example 5

| Device | Hydrophobic Modification Device 1 | | | Hydrophobic Modification Device 2 | | |
|---|---|---|---|---|---|---|
| Raw Material | SiO$_2$ | DMDS | N$_2$ | SiO$_2$ | HMDS | N$_2$ |
| Feed rate | 30 kg/h | 2.1 kg/h | 78 kg/h | 30 kg/h | 2.5 kg/h | 75 kg/h |
| Process parameters | Furnace 2-1 | Furnace 2-2 | Furnace 2-3 | Furnace 2-1 | Furnace 2-2 | Furnace 2-3 |
| Temperature (° C.) | 120-200 | 150-220 | 200-300 | 150-200 | 180-250 | 220-300 |
| Product | | V-1 | | | V-2 | |

Comparative Example 1

The parallel-connected modification structure devices are also used, each set as an independent fumed silica hydrophobic modification device. Wherein, the hydrophobic modifier of the first set of modification devices is Hydroxy-terminated polydimethylsiloxane (PDMS), and the hydrophobic modifier of the second set of modification devices is Hexamethyldisilazane (HMDS); the specific surface area of hydrophilic fumed silica is 200 m$^2$/g, and the carrier gas is nitrogen. By adjusting the flow rate of nitrogen, the time for the powder to pass through the reaction furnace is maintained for 10~60 mins. The ratio of the respective raw materials and the main process parameters are shown in Table 6. The difference from FIG. 1 in Example 1 is that the unreacted modifiers separated by the respective exhaust gas separation systems in the two sets of modification devices are directly returned to the second fluidized bed reaction furnace of the respective modification devices, while the separated by-products directly enter into the exhaust gas treatment system and are discharged after qualified treatment. The obtained hydrophobic fumed silica samples are C-1 and C-2.

TABLE 6

Raw material ratio and main process parameters in Comparative Example 1

| Device | Hydrophobic Modification Device 1 | | | Hydrophobic Modification Device 2 | | |
|---|---|---|---|---|---|---|
| Raw Material | SiO$_2$ | PDMS | N$_2$ | SiO$_2$ | HMDS | N$_2$ |
| Feed rate | 30 kg/h | 6.2 kg/h | 75 kg/h | 30 kg/h | 2.5 kg/h | 75 kg/h |
| Process parameters | Furnace 1-1 | Furnace 1-2 | Furnace 1-3 | Furnace 2-1 | Furnace 2-2 | Furnace 2-3 |
| Temperature (° C.) | 200-250 | 230-320 | 300-380 | 150-200 | 180-250 | 220-300 |
| Product | C-1 | | | C-2 | | |

Comparative Example 2

The parallel-connected modification structure devices are also used, each set as an independent fumed silica hydrophobic modification device. Wherein, the hydrophobic modifier of the first set of modification devices is Hydroxy-terminated polydimethylsiloxane (PDMS), and the hydrophobic modifier of the second set of modification devices is Dimethyldimethoxysilane (DMDS); the specific surface area of hydrophilic fumed silica is 200 m$^2$/g, and the carrier gas is nitrogen. By adjusting the flow rate of nitrogen, the time for the powder to pass through the reaction furnace is maintained for 10~60 mins. The ratio of the respective raw materials and the main process parameters are shown in Table 7. The difference from FIG. 1 in Example 1 is that the unreacted modifiers separated by the respective exhaust gas separation systems in the two sets of modification devices are directly returned to the second fluidized bed reaction furnace of the respective modification devices, while the separated by-products directly enter into the exhaust gas treatment system and are discharged after qualified treatment. The obtained hydrophobic fumed silica samples are C-3 and C-4.

TABLE 7

Raw material ratio and main process parameters in Comparative Example 2

| Device | Hydrophobic Modification Device 1 | | | Hydrophobic Modification Device 2 | | |
|---|---|---|---|---|---|---|
| Raw Material | SiO$_2$ | PDMS | N$_2$ | SiO$_2$ | DMDS | N$_2$ |
| Feed rate | 30 kg/h | 6.2 kg/h | 75 kg/h | 30 kg/h | 3.2 kg/h | 72 kg/h |
| Process parameters | Furnace 1-1 | Furnace 1-2 | Furnace 1-3 | Furnace 2-1 | Furnace 2-2 | Furnace 2-3 |
| Temperature (° C.) | 200-250 | 230-320 | 300-380 | 180-250 | 200-300 | 250-350 |
| Product | C-3 | | | C-4 | | |

Comparative Example 3

Figure 7:
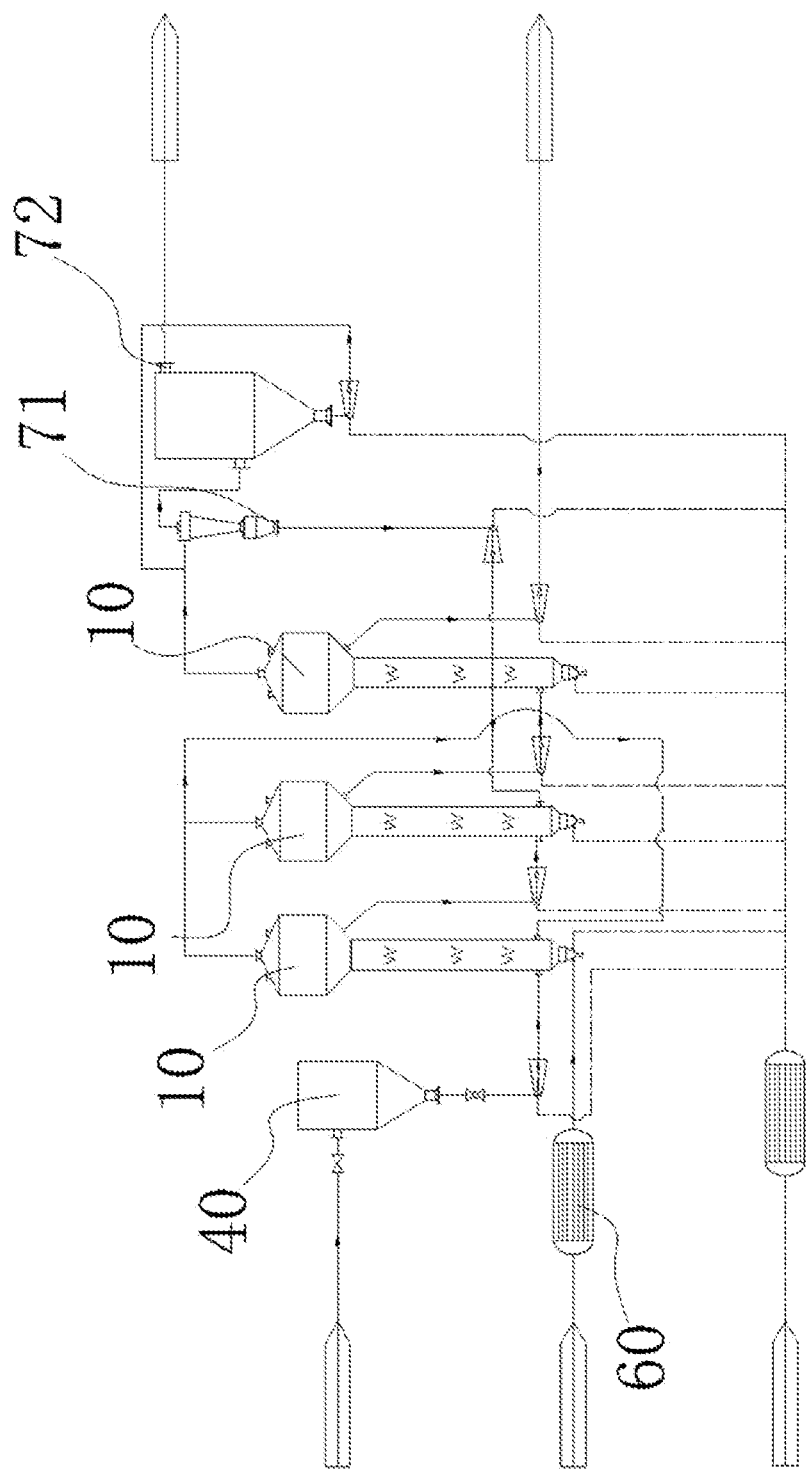
FIG. 7 is the hydrophobic modification device of fumed silica used in comparative example 3.

The parallel-connected modification structure devices are also used, each set as an independent fumed silica hydrophobic modification device. Wherein, the hydrophobic modifier of the first set of modification devices is dimethyldichlorosilane (DMDC), and the hydrophobic modifier of the second set of modification devices is Hexamethyldisilazane (HMDC); The specific surface area of hydrophilic fumed silica is 200 m$^2$/g, and the carrier gas is nitrogen. By adjusting the flow rate of nitrogen, the time for the powder to pass through the reaction furnace is maintained for 10~60 mins. The ratio of the respective raw materials and the main process parameters are shown in Table 8. The material flow of each set of modification devices is shown in FIG. 7. In the two sets of devices, the exhaust gas from the first and second reaction furnaces of each set of modification devices is returned to the first reaction furnace of the respective modification devices. The exhaust gas from the third reaction furnace enters the cyclone separator, and the separated powder is returned to the second reaction furnace of the respective modification device; the separated gas enters the bag filter for filtration, and the filtered gas directly enters the exhaust gas treatment system, and is discharged after qualified treatment. The obtained hydrophobic fumed silica samples are C-5 and C-6.

TABLE 8

Raw material ratio and main process parameters in Comparative Example 3

| Device | Hydrophobic Modification Device 1 | | | Hydrophobic Modification Device 2 | | |
|---|---|---|---|---|---|---|
| Raw Material | SiO$_2$ | DMDC | N$_2$ | SiO$_2$ | HMDS | N$_2$ |
| Feed rate | 30 kg/h | 3.2 kg/h | 72 kg/h | 30 kg/h | 3 kg/h | 75 kg/h |
| Process parameters | Furnace 1-1 | Furnace 1-2 | Furnace 1-3 | Furnace 2-1 | Furnace 2-2 | Furnace 2-3 |
| Temperature (° C.) | 180-250 | 200-300 | 250-350 | 150-200 | 180-250 | 220-300 |
| Product | | C-5 | | | C-6 | |

The technical indexes of the example samples, comparative examples samples are as shown in table 9.

TABLE 9

Samples Technical Indexes

| Sample No. | pH Value | carbon content (%) | Volatile matter at 105° C. (%) |
|---|---|---|---|
| I-1 | 5.2 | 1.23 | 0.35 |
| I-2 | 6.2 | 1.70 | 0.25 |
| II-1 | 4.7 | 1.27 | 0.40 |
| II-2 | 5.5 | 1.33 | 0.32 |
| III-1 | 4.2 | 1.18 | 0.37 |
| III-2 | 5.8 | 4.90 | 0.42 |
| IV-1 | 6.6 | 5.20 | 0.35 |
| IV-2 | 6.5 | 1.75 | 0.20 |
| V-1 | 5.9 | 1.35 | 0.32 |
| V-2 | 6.7 | 1.72 | 0.23 |
| C-1 | 5.6 | 4.20 | 0.33 |
| C-2 | 7.2 | 1.45 | 0.38 |
| C-3 | 6.2 | 4.40 | 0.45 |
| C-4 | 5.0 | 1.22 | 0.42 |
| C-5 | 4.2 | 1.05 | 0.32 |
| C-6 | 6.9 | 1.50 | 0.27 |

Test method: GB/T 20020-2013.

The specific conditions and parameters of the auxiliary gas of each set of devices in the examples and comparative examples are compared as follows:

TABLE 10

DMDC modification

| | SiO$_2$ (kg/h) | DMDC (kg/h) | N$_2$ (kg/h) | Temperature (° C.) | | | pH value | carbon content (%) | Volatile matter at 105° C. (%) | Auxiliary gas |
|---|---|---|---|---|---|---|---|---|---|---|
| | | | | Furnace-1 | Furnace-2 | Furnace-3 | | | | |
| I-1 | 30 | 2.2 | 75 | 100-180 | 130-200 | 180-250 | 5.2 | 1.23 | 0.35 | NH$_3$ |
| II-1 | 30 | 2.2 | 75 | 100-180 | 130-200 | 180-250 | 4.7 | 1.27 | 0.4 | CH$_3$OH |
| III-1 | 30 | 2.2 | 75 | 100-180 | 130-200 | 180-250 | 4.2 | 1.18 | 0.37 | H$_2$O |
| C-5 | 30 | 3.2 | 72 | 180-250 | 200-300 | 250-350 | 4.2 | 1.05 | 0.32 | none |

From the results in Table 10, it can be seen that the reaction conditions and raw material ratios of samples I-1~III-1 are the same, while the auxiliary gas used is different, and the carbon content, pH value, and volatile matter at 105° C. of the modified products are different. In the reaction of DMDC and silica, the by-products H$_2$O, NH$_3$ and CH$_3$OH are beneficial to the reaction and the removal of HCl. Compared with C-5, it is found that the amount of modifier DMDC in C-5 is 45% higher than that of others, and the amount of carrier gas is also lower (slow flow rate, long reaction time). The reaction temperature is higher, but the carbon content of the modified product is low, and the pH value is also low, indicating that the reaction efficiency is lower than that of other examples.

TABLE 11

HMDS modification

| | SiO$_2$ | HMDS | N$_2$ | Temperature (° C.) | | | pH | carbon content | Volatile matter at 105° C. | Auxiliary |
|---|---|---|---|---|---|---|---|---|---|---|
| | (kg/h) | (kg/h) | (kg/h) | Furnace-1 | Furnace-2 | Furnace-3 | value | (%) | (%) | gas |
| I-2 | 30 | 2.5 | 75 | 150-200 | 180-250 | 220-300 | 6.2 | 1.7 | 0.25 | HCl |
| IV-2 | 30 | 2.5 | 75 | 150-200 | 180-250 | 220-300 | 6.5 | 1.75 | 0.2 | H$_2$O |
| V-2 | 30 | 2.5 | 75 | 150-200 | 180-250 | 220-300 | 6.7 | 1.72 | 0.23 | CH$_3$OH |
| C-2 | 30 | 2.5 | 75 | 150-200 | 180-250 | 220-300 | 7.2 | 1.45 | 0.38 | none |
| C-6 | 30 | 3 | 75 | 150-200 | 180-250 | 220-300 | 6.9 | 1.5 | 0.27 | none |

It can be seen from Table 11 that the test conditions of I-2, IV-2, V-2 and C-2 are the same, but the auxiliary gas is different, wherein C-2 has no auxiliary gas; and C-6 has no auxiliary gas, and the amount of modifier HMDS is 20% higher. However, from the results, the auxiliary gas is conducive to the progress of the reaction (high carbon content), and is also conducive to the removal of by-product NH3 (low pH value).

TABLE 12

PDMS modification

| | SiO$_2$ | PDMS | N$_2$ | Temperature (° C.) | | | pH | Carbon content | Volatile matter at 105° C. | Auxiliary |
|---|---|---|---|---|---|---|---|---|---|---|
| | (kg/h) | (kg/h) | (kg/h) | Furnace-1 | Furnace-2 | Furnace-3 | value | (%) | (%) | gas |
| III-2 | 30 | 5 | 82 | 180-250 | 200-280 | 250-350 | 5.8 | 4.9 | 0.42 | HCl |
| IV-1 | 30 | 5 | 82 | 180-250 | 200-280 | 250-350 | 6.6 | 5.2 | 0.35 | NH$_3$ |
| C-1 | 30 | 6.2 | 75 | 200-250 | 230-320 | 300-380 | 5.6 | 4.2 | 0.33 | None |
| C-3 | 30 | 6.2 | 75 | 200-250 | 230-320 | 300-380 | 6.2 | 4.4 | 0.45 | none |

As shown in Table 12, the amount of C-1 and C-3 modifier is 20% higher, and the amount of nitrogen is 8.5% lower, and the reaction temperature is also higher, but the carbon contents are over 10% lower than that of III-2 and Iv-1, which shows that both HCl and HN$_3$ can promote the modification reaction and improve the reaction efficiency.

TABLE 13

DMDS modification

| | SiO$_2$ | DMDS | N$_2$ | Temperature (° C.) | | | pH | carbon content | Volatile matter at 105° C. | Auxiliary |
|---|---|---|---|---|---|---|---|---|---|---|
| | (kg/h) | (kg/h) | (kg/h) | Furnace-1 | Furnace-2 | Furnace-3 | value | (%) | (%) | gas |
| II-2 | 30 | 2.1 | 78 | 120-200 | 150-220 | 200-300 | 5.5 | 1.33 | 0.32 | HCl |
| V-1 | 30 | 2.1 | 78 | 120-200 | 150-220 | 200-300 | 5.9 | 1.35 | 0.32 | NH$_3$ |
| C-4 | 30 | 3.2 | 72 | 180-250 | 200-300 | 250-350 | 5 | 1.22 | 0.42 | none |

As shown in Table 13, the amount of C-4 modifier is 52% higher than that of the others. The amount of nitrogen is also lower, and the reaction temperature is higher, but its carbon content is over 8% lower, which indicates that both HCl and NH$_3$ can promote the modification reaction and improve the reaction efficiency.

The technical features of the above embodiments can be combined arbitrarily. To simplify description, all possible combinations of the technical features of the above embodiments are not described. However, as long as there is no contradiction in the combination of these technical features, they should be considered to be the scope recorded in the description.

The above embodiments express several implementations of the present disclosure only. The description of the embodiments is relatively specific and detailed, but may not therefore be construed as the limitation on the patent scope of the present disclosure. It should be noted that a person of ordinary skill in the art may further make several variations and improvements without departing from the concept of the present disclosure. These variations and improvements all fall within the protection scope of the present disclosure. Therefore, the patent protection scope of the present disclosure shall be defined by the appended claims.

What is claimed is:

1. A combined treatment method for surface modification of fumed silica, comprising the following steps:
   step (1) two sets of modification devices are used to jointly treat fumed silica, each of which includes a reaction furnace and a gas separator; the fumed silica is treated with a modifier in the reaction furnace of each set of modification devices, and two groups of modified fumed silica and exhaust gas are obtained respectively;
   step (2) the exhaust gas obtained in the step (1) is separated respectively to obtain unreacted modifier and by-products; and the obtained by-products are input into the reaction furnace of the other set of modification devices as reaction assistants to participate in the modification reaction; and the obtained unreacted modifiers are returned to the reaction furnace of the original modification devices for repeated use;

wherein, the modifiers used in the two sets of modification devices are different from each other and are selected from organochlorosilanes, alkylsiloxanes, alkylsilazanes, hydroxyl-terminated polysiloxanes and cyclosiloxanes; wherein, the modifiers used in the two sets of modification devices are not both selected from hydroxyl-terminated polysiloxanes or cyclosiloxanes.

2. The combined treatment method for surface modification of fumed silica according to claim 1, wherein a structural formula of the organochlorosilane is $R_m^1SiCl_{4-m}$; a structural formula of the alkylsiloxane is $R_m^2Si(OR^3)_{4-m}$; a structural formula of the alkylsilazane is

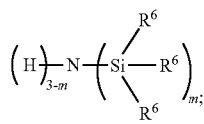

a structural formula of the hydroxyl-terminated polysiloxanes is

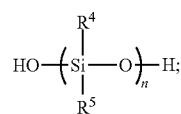

a structural formula of the cyclosiloxane is

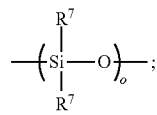

wherein,
$R^1$, $R^3$ are independently selected from C1~C6 alkyl;
$R^2$ is selected from C1~C22 alkyl;
$R^4$, $R^5$ are independently selected from C1~C6 alkyl, C2~C6 alkenyl or benzene;
each $R^6$, $R^7$ is independently selected from H, C1~C6 alkyl or $C_2$~C6 alkenyl;
m is independently selected from the natural numbers from 1 to 3, n is selected from the natural numbers from 3 to 30, and o is selected from the natural numbers from 3 to 6.

3. The combined treatment method for surface modification of fumed silica according to claim 2, wherein,
$R^1$ and $R^3$ are independently selected from methyl, ethyl, n-propyl, isopropyl, n-butyl, isobutyl, tert-butyl, n-pentyl or n-hexyl;
$R^2$ is selected from methyl, ethyl, n-propyl, isopropyl, n-butyl, isobutyl, tert-butyl, n-pentyl, n-hexyl or C7~C16 alkyl;
$R^4$ and $R^5$ are independently selected from methyl, ethyl, n-propyl, isopropyl, n-butyl, isobutyl, tert-butyl, n-pentyl, hexyl, vinyl, propenyl or phenyl;
each $R^6$, $R^7$ is independently selected from H, methyl, ethyl, n-propyl, isopropyl, n-butyl, isobutyl, tert-butyl, n-pentyl, hexyl, vinyl, propenyl, butene or pentenyl;
m is independently selected from 1, 2 or 3, n is selected from a natural number from 3 to 20, and o is selected from 3, 4, 5 or 6.

4. The combined treatment method for surface modification of fumed silica according to claim 3, wherein,
the organochlorosilane is selected from dimethyldichlorosilane or trimethylchlorosilane;
the alkylsiloxane is selected from dimethyldimethoxysilane, dimethyldiethoxysilane, diethyldimethoxysilane or diethyldiethoxysilane;
the hydroxyl-terminated polysiloxane is selected from hydroxyl-terminated polydimethylsiloxane, hydroxyl-terminated polymethylvinylsiloxane or hydroxyl-terminated polymethylphenylsiloxane;
the cyclosiloxane is selected from hexamethylcyclotrisiloxane, octamethylcyclotetrasiloxane, decamethylcyclopentasiloxane or dodecamethylcyclohexasiloxane.

5. The combined treatment method for surface modification of fumed silica according to claim 1, wherein the modifier used in one set of the modification devices is organochlorosilane, and the modifier used in the other set of the modification devices is alkylsiloxane, alkylsilazane, hydroxyl terminated polysiloxane or cyclosiloxane; or
the modifier used in one set of the modification devices is alkylsiloxane, and the modifier used in the other set of the modification devices is alkylsilazane, hydroxyl-terminated polysiloxane or cyclosiloxane; or
the modifier used in one set of the modification devices is alkylsilazane, and the modifier used in the other set of the modification devices is hydroxyl terminated polysiloxane or cyclosiloxane alkyl.

6. The combined treatment method for surface modification of fumed silica according to claim 1, wherein, the process of separating the exhaust gas in the step (2) includes: separating a fumed silica powder and gas in the exhaust gas once, returning the fumed silica powder obtained by the primary separation to the reaction furnace of the original modification devices to continue the modification reaction; filtering the gas obtained from the primary separation; the gas obtained from the filtration is separated through gas separation into the unreacted modifiers and by-products, and the fumed silica powder obtained by the filtration is returned for the primary separation.

7. The combined treatment method for surface modification of fumed silica according to claim 1, wherein, in the step (1), under fluidization of inert gas, the modifier is contacted and reacted with the fumed silica; by adjusting a flow rate of the inert gas, a time for a fumed silica powder passing through the reaction furnace is maintained for 10-60 minutes.

8. The combined treatment method for surface modification of fumed silica according to claim 1, wherein, in each set of modification devices, a raw material mass ratio of the fumed silica and the modifier is 25-35:1-7; and
a reaction temperature of the modification reaction is 100° C.-350° C.

9. The combined treatment method for surface modification of fumed silica according to claim 1, wherein the exhaust gas in the step (1) is input into a gas separator for gas separation to obtain unreacted modifiers and by-products; the obtained unreacted modifiers are returned to the reaction furnace of the original modification devices for repeated use; the obtained by-products are input into the reaction furnace of the other set of modification devices as reaction assistants to participate in the modification reaction.

10. The combined treatment method for surface modification of fumed silica according to claim 9, wherein each set of modification devices further include a separation member;

before the exhaust gas is input into the gas separator, it is first input into the separation member to separate a fumed silica powder and gas, and the separated fumed silica powder is returned to the reaction furnace of the original modification devices to be modified again, and the separated gas is input into the gas separator for gas separation.

11. The combined treatment method for surface modification of fumed silica according to claim 10, wherein the separation member includes a cyclone separator and a bag filter; before the exhaust gas is input into the gas separator, it is firstly input into the cyclone separator for primary separation, the fumed silica powder obtained from the primary separation is returned to the reaction furnace of the original modification devices for further modification, and the gas obtained from the primary separation is input into the bag filter for filtration; the gas obtained from the filtration is input into the gas separator for gas separation, and the fumed silica powder obtained from the filtration is returned to the cyclone separator for the primary separation.

12. The combined treatment method for surface modification of fumed silica according to claim 9, wherein each set of modification devices includes at least two series-connected reaction furnaces; the fumed silica and the modifier are first subjected to a modification reaction in a first reaction furnace, and the fumed silica powder discharged from the first reaction furnace is then input into a second reaction furnace to continue the modification reaction;

the unreacted modifier obtained by separation in the step (2) is vaporized and returned to the second reaction furnace of the original modification devices for repeated use; the by-products obtained by separation in the step (2) are input into the first reaction furnace of the other set of modification devices as reaction assistants to participate in the modification reaction.

13. The combined treatment method for surface modification of fumed silica according to claim 12, wherein each set of the modification devices includes three series-connected reaction furnaces, and the fumed silica powder discharged from the second reaction furnace is input into a third reaction furnace to continue the modification reaction.

* * * * *